(12) United States Patent
Li (10) Patent No.: US 7,542,591 B2
(45) Date of Patent: Jun. 2, 2009

(54) TARGET OBJECT DETECTING METHOD, APPARATUS, AND PROGRAM

(75) Inventor: Yuanzhong Li, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 513 days.

(21) Appl. No.: 11/067,223

(22) Filed: Feb. 28, 2005

(65) Prior Publication Data
US 2005/0190963 A1 Sep. 1, 2005

(30) Foreign Application Priority Data
Feb. 26, 2004 (JP) ............................. 2004-051322

(51) Int. Cl.
G06K 9/00 (2006.01)
(52) U.S. Cl. ...................... 382/118; 382/103; 382/218; 340/5.53; 340/5.83
(58) Field of Classification Search ................. 382/103, 382/118, 218; 340/5.53, 5.83
See application file for complete search history.

(56) References Cited

U.S. PATENT DOCUMENTS

| | | | |
|---|---|---|---|
| 5,715,325 A * | 2/1998 | Bang et al. | 382/118 |
| 6,184,926 B1 * | 2/2001 | Khosravi et al. | 348/239 |
| 6,885,760 B2 * | 4/2005 | Yamada et al. | 382/118 |
| 2002/0085771 A1 | 7/2002 | Sakuramoto | |
| 2004/0240708 A1 * | 12/2004 | Hu et al. | 382/103 |

FOREIGN PATENT DOCUMENTS

JP 11-341272 A 12/1999

OTHER PUBLICATIONS

Phantom Faces for Face Analysis, Laurenz Wiskott, 1997, IEEE Publications, pp. 308-311.*
T. Kohonen, "Self-Organization and Associative Memory", Springer-Verlag, 1984, pp. 125-161.
Taiwei Lu et al., "Self-organizing optical neural network for unsupervised learning", Optical Engineering, Sep. 1990, vol. 29, No. 9, pp. 1107-1113.

* cited by examiner

Primary Examiner—John B Strege
(74) Attorney, Agent, or Firm—Sughrue Mion, PLLC (57) ABSTRACT

Detecting a predetermined target object from a digital image reliably and rapidly. The standard face detecting section performs detection process for detecting a standard face from a photograph image. The eyeglassed face detecting section performs detection process for detecting an eyeglassed face from the photograph image from which no face has been detected by the standard face detecting section. The whiskered face detecting section performs detection process for detecting a whiskered face from the photo image from which no face has been detected by the standard face detecting section and eyeglassed face detecting section.

10 Claims, 9 Drawing Sheets

TARGET OBJECT DETECTING METHOD, APPARATUS, AND PROGRAM

BACKGROUND OF THE INVENTION

1. Field of the Invention

The present invention relates to a target object detecting method and apparatus for detecting a targeted object from a digital image. The present invention also relates to a program for causing a computer to execute the method.

2. Description of the Related Art

As for the method for detecting a predetermined target object from a digital image, a matching-based method is widely used. In the matching method, a target object is detected by matching the model of the object to be detected (template) with the target object in a digital image (template matching). The template matching, however, has many drawbacks. For example, it may not tolerate various variations (size, direction, deformation) of a target object in a digital image and the like, since the object models are fixed as described, for example, in "Image Analysis Handbook", Takagi and Shimoda, pp 171-205, 1991, University of Tokyo Press. Consequently, in order to realize a detection method which is robust against these problems, several detecting methods are proposed as described, for example, in "Evaluation of Pattern Description By KL Expansion for Application to Face Image Discrimination", Akamatsu, et al., NTT Human Interface Laboratory, and "One Method of Face Image Processing Using Hough's Conversion", Hasegawa and Shimizu, Osaka City University, Shingihou, PR090-153. These methods use KL expansion or Hough's conversion to project a digital image to a space where characteristics of a target object in the digital image are handled more easily for detecting the target object. But, these methods may not fully tolerate variations of a target object, and are used, therefore, by setting certain conditions for detection.

Recently, as the method for solving the problems described above, a method based on a neural network modeled after the image processing of the human brain has been proposed. The neural network method described above is one of the studying methods for image processing known as the architectural method, and many studies, such as the visual model, learning model, and associative memory model, have been conducted. The method creates an appropriate neural network model in view of known physiological facts and findings, examines the behavior and performance of the model created, and compares them with actual behaviors and performance of the human brain to understand the image processing principle of the human brain.

For example, as an epistemic model of the neural network, which is robust against disagreement in size and location of the target object, a so called neocognitoron is known as described, for example, in "Neural Network Model for a Mechanism of Pattern Recognition Unaffected by Shift in Position-Neocognitoron", Kunihiko Fukushima, The Institute of Electronics, Information and Communication Engineers Article A, J62-A (10), pp 658-665, October, 1979. The neocognitoron is based on the doctrine in which the pattern matching is performed on a small section of the target object by gradually absorbing the displacement in stepwise based on a hierarchical structure.

As described above, in neocognitoron, the procedure for gradually tolerating the displacement in stepwise not only removes the displacement of an input pattern but also plays an important roll in performing pattern recognition which is robust against deformations. That is, the adverse effects of the relative displacement of the local characteristics are gradually absorbed in the course of integrating the characteristics, and eventually an output not influenced by considerable deformations of the input pattern may be obtained.

As for the learning model, the Kohonen's self-organization mapping is known through "Self-Organization and AssociativeMemory", T. Kohonen, Springer-Verlag, 1984. The Kohonen's self-organization mapping is a model in which a topological mapping is learned through self-organization. The topological mapping means, for example, the process of allocating a signal received by a human being from outside, i.e., a certain pattern, to neurons of the cortex reflecting the order based on a certain rule.

As one example of the system that utilizes the Kohonen's self-organization, an experiment in which binary images are learned by a hard system is reported in "Self-organizing Optical Neural Network for Unsupervised Learning", Taiwei Lu, et al., Optical Engineering, Vol. 29, No. 9, 1990.

In the mean time, processes for detecting a predetermined target object are performed in many areas. For example, in the area of identification photograph, a grant application for passport or certificate, or in provision of a personal resume, submission of a photograph of the applicant face having a predetermined size, i.e., an ID photograph is often required. For this reason, automatic ID photograph creation systems have been used. The system has a photo studio in which the user sit on a chair to have his/her face taken (facial photograph image) and an ID photograph sheet on which facial photograph images for identification are recorded is created automatically. But such a system is large and the installation site is limited, so that the user must locate the installation site of the automatic ID photograph creation system in order to obtain an ID photograph, which is inconvenient to the user.

A method for solving the problem described above is proposed as described, for example, in Japanese Unexamined Patent Publication No. 11 (1999)-341272. The method provides an ID photograph by the following steps. First, display a facial photograph image to be used for the ID photograph on a display, such as a monitor. Then, indicate the top of the head and tip of the jaw of the facial photograph image on the screen to instruct a computer to create the ID photograph. The computer, in turn, enlarges/reduces the image to obtain a scaling rate and the position of the face based on the two positions indicated by the operator and the output specification of the ID photograph. Then, the computer performs trimming for the enlarged/reduced image so that the face in the enlarged/reduced image is placed at a predetermined location. In this way, the user may ask DPE shops, which may be more frequently encountered than the automatic ID photograph creation systems, to create the ID photograph. In addition, the user may bring in a DPE shop a photographic film or a recording medium out of his/her stock on which a favorite photo image is recorded in order to create the ID photograph from the favorite photo image.

However, in the method described above, the operator must perform the troublesome chore of indicating the top of the head and tip of the jaw of the facial photograph image displayed on a display screen. This is especially burdensome for the operator who handles ID photographs of many customers. Further, if the area of the face region of the facial photograph image displayed on a display screen is small, or the resolution of the facial photograph image is coarse, the operator may not indicate the top of the head and tip of the jaw quickly and accurately, so that an appropriate ID photograph may not be provided promptly.

Consequently, many methods for setting the trimming area promptly and accurately to reduce the burden of the operator are proposed. For example, an automatic trimming method is proposed in U.S. Patent Application Publication No. 20020085771. In the method described above, the top of the head and eyes in a facial photograph image are located and the trimming area is set by determining the position of the jaw based on the positions of the top of the head and eyes. The most important process in the automatic trimming is the detection of the regions for setting the trimming area. These regions, i.e., the target objects for detection may be, for example, the positions of the top of the head and eyes, entire face portion, both pupils, or the combination thereof as described in U.S. Patent Application Publication No. 20020085771.

Various methods for detecting target objects described above are used for detecting these regions.

But, in detecting a predetermined target object from a digital image, the target object included in the digital image is not always detected. For example, in detecting a face from a facial photograph image, a face having a standard characteristic may readily be detected. But a face having a certain specific characteristic (eyeglassed face, heavily whiskered face, uniquely hairstyled face, etc.) is difficult to be detected. The reason for this is that the faces found in the world are predominated by the standard faces, thus the face detection algorithms are designed based on the standard faces.

On the other hand, if face detection algorithms capable of detecting faces having specific characteristics are incorporated in the face detection process, as well as a face detection algorithm for detecting standard faces, in order to detect faces having specific characteristics, including those described above, a huge amount of calculations is required and the detection accuracy for standard faces may be degraded, which is like "putting the cart before the horse".

SUMMARY OF THE INVENTION

The present invention has been developed in view of the circumstances described above, and it is an object of the present invention to provide a target object detecting method and apparatus capable of detecting a predetermined target object having a specific characteristic, as well as the predetermined target object having a standard characteristic, in detecting a predetermined target object from a digital image, without requiring a huge amount of calculations. It is a further object of the present invention to provide a program for causing a computer to execute the target object detecting method described above.

A target object detecting method according to the present invention is a target object detecting method for detecting from a digital image a predetermined target object included therein, the method comprising the steps of:

performing a standard target object detecting process for detecting the predetermined target object having a standard characteristic on the digital image; and performing a characteristic target object detecting process for detecting the predetermined target object having a predetermined specific characteristic on the digital image from which the predetermined target object has not been detected by the standard target object detecting process.

Here, the present invention may be applied not only to digital images obtained by digital cameras and the like, but also to any image which may be represented in digital form, such as that obtained by reading an image printed on a printing medium, including printing paper and photo paper, using a reading device, such as a scanner.

Preferably, in the target object detecting method of the present invention, a plurality of characteristic target object detecting processes, each corresponding to each of the predetermined specific characteristics that differ from each other, are performed sequentially until the predetermined target object has been detected.

The target object detecting method of the present invention may be applied to a process for detecting a face from a facial photograph image.

A target object detecting apparatus of the present invention is a target object detecting apparatus for detecting from a digital image a predetermined target object included therein, the apparatus comprising:

a standard target object detecting means for detecting the predetermined target object having a standard characteristic from the digital image;

a characteristic target object detecting means for detecting the predetermined target object having a predetermined specific characteristic; and a control means for controlling the characteristic target object detecting means so that the detection process by the characteristic target object detecting means is performed on the digital image from which the predetermined target object has not been detected by the standard target object detecting means.

Preferably, a plurality of characteristic target object detecting means is provided, each corresponding to each of the predetermined characteristics that differ from each other, and the control means is a control means for controlling the plurality of characteristic target object detecting means so that the detection processes by the plurality of characteristic target object detecting means are performed sequentially until the predetermined target object has been detected.

The target object detecting apparatus of the present invention may be used for detecting a face from a facial photograph image.

A program of the present invention is a program for causing a computer to execute the target object detecting method described above.

According to the present invention, in detecting a predetermined target object from a digital image, the standard target object detecting process is performed first on a digital image, noting the fact that predetermined target objects having a standard characteristic are greater in numbers than the predetermined target objects having certain specific characteristics. Then, if the predetermined target object has not been detected, the characteristic target object detecting process is performed. Thus, the target object which is the predetermined target object having a standard characteristic included in a digital image may be detected first. For the digital image from which the predetermined target object has not been detected by the standard target object detecting process, the characteristic target object detecting process is performed, thus the target object having a certain specific characteristic compared with the standard target object may be detected. Here, in performing the standard target object detecting process, no consideration is required for detecting the target object having a specific characteristic, so that high detection accuracy for the standard target object may be obtained. In addition, rapid processing may be realized by separating the standard target object detecting process from the characteristic target object detecting processes.

In the present invention, if a plurality of characteristic target object detecting processes is provided, each corresponding to each of a plurality of different characteristics the target object may have, and these characteristic target object detecting processes are performed sequentially until the target object has been detected, more reliable detection for the target object having a specific characteristic may be obtained.

DESCRIPTION OF THE PREFERRED EMBODIMENTS

Hereinafter, an embodiment of the present invention will be described with reference to accompanying drawings.

Figure 1:
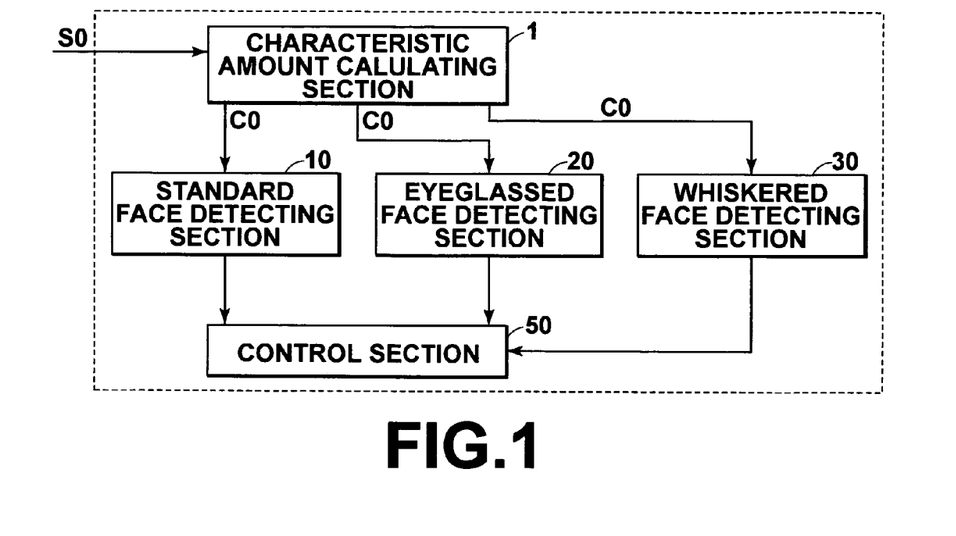
FIG. 1 is a block diagram of a face detecting apparatus according to an embodiment of the present invention, illustrating the structure thereof.

FIG. 1 is a block diagram of a face detecting apparatus according to an embodiment of the present invention, illustrating the structure thereof. The structure of the face detecting apparatus shown in FIG. 1 may be realized by executing a face detecting program, which is read into an auxiliary storage unit, on a computer (e.g., a personal computer, and the like). The face detecting program is recorded on an information recording medium, such as a CD-ROM and the like, or distributed through a network including the Internet and the like, and installed on the computer. The face detecting apparatus of the present embodiment is a face detecting apparatus for detecting a face region from a photograph image to obtain the image of that region (facial image). The photograph images to be processed are not limited to those obtained by digital cameras and the like, but any digital image obtained by reading a photograph image printed on a printing medium using a reading device may be included.

As shown in FIG. 1, the face detecting apparatus of the present embodiment comprises: a characteristic amount calculating section 1 for calculating characteristic amounts C0 from a facial photograph image (hereinafter referred to simply as "photo image S0"); a standard face detecting section 10 for detecting a standard face from the photo image S0; an eyeglassed face detecting section 20 for detecting an eyeglassed face from the photo image S0 when the detection by the standard face detecting section 10 has failed; a whiskered face detecting section 30 for detecting a whiskered face from the photo image S0 when the detection by the eyeglassed face detecting section 20 has failed; and a control section 50 for controlling the respective detecting sections described above.

Figure 2:
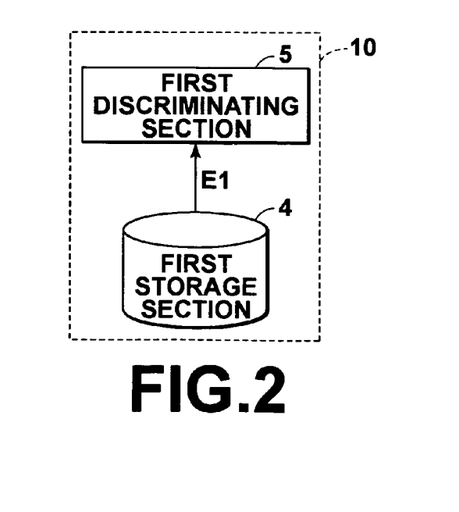
FIG. 2 is a block diagram of a standard face detecting section 10 of the face detecting apparatus shown in FIG. 1, illustrating the structure thereof.

FIG. 2 is a block diagram of the standard face detecting section 10, illustrating the structure thereof. As shown in the drawing, the standard face detecting section 10 comprises a first storage section 4 having a first reference data E1 stored therein; and a first discriminating section 5 for detecting a face from the photo image S0 using characteristic amounts C0 calculated by the characteristic amount calculating means 1 and the first reference data E1. The characteristic amount calculating section 1 will be described first.

Figure 3A:
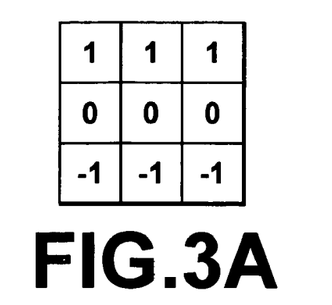
FIG. 3A is a drawing, illustrating an edge detecting filter.
Figure 3B:
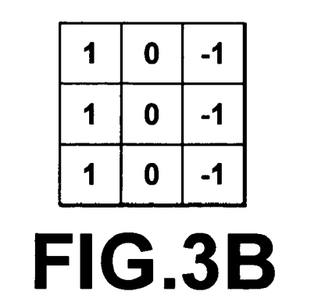
FIG. 3B is a drawing, illustrating an edge detecting filter.
Figure 4:
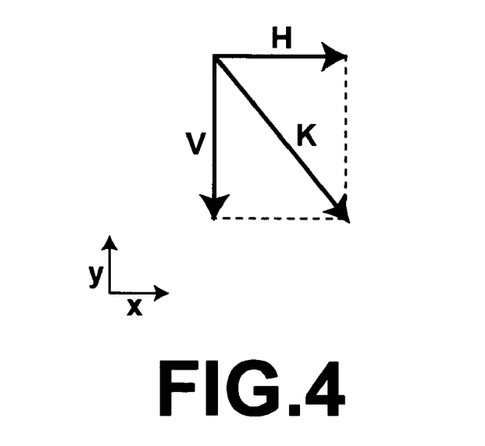
FIG. 4 is a drawing for describing how to calculate a gradient vector.

The characteristic amount calculating section 1 calculates characteristic amounts used for discriminating a face from the photo image S0. More specifically, it calculates a gradient vector (i.e., direction to which density of each of the pixels on the photo image S0 changes and the magnitude thereof) as the characteristic amount C0. Hereinafter, the method for calculating the gradient vectors will be described. First, the characteristic amount calculating means 1 detects edges in the horizontal direction within the photo image S0 by administering a filtering process with a horizontal edge detecting filter shown in FIG. 3A. The characteristic amount calculating means 1 also detects edges in the vertical direction within the photo image S0 by administering a filtering process with a vertical edge detecting filter shown in FIG. 3B. Then, a gradient vector K for each pixel of the photo image S0 is calculated from the size H of horizontal edges and the size V of the vertical edges, as illustrated in FIG. 4. The characteristic amount calculating means 1 calculates the characteristic amounts C0 at each deformation stage of the photo image S0 and face image as will be described later.

Figure 5A:
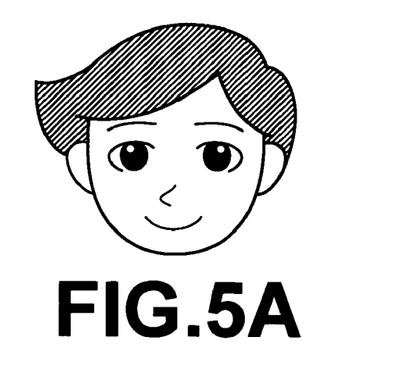
FIG. 5A is a drawing, illustrating a human face.
Figure 5B:
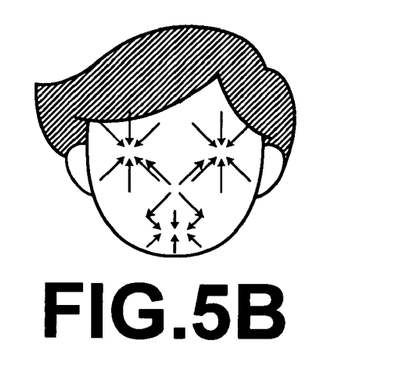
FIG. 5B is a drawing, illustrating gradient vectors in the vicinity of the eyes and mouth of the human face shown in FIG. 5A.

In the case of a human face such as that illustrated in FIG. 5A, the gradient vectors K calculated in the manner described above are directed toward the centers of the eyes and mouth, which is dark, and are directed away from the nose, which is bright, as illustrated in FIG. 5B. In addition, the magnitudes of the gradient vectors K are greater for the eyes than for the mouth, because the change in density is greater for the eyes than for the mouth.

The direction and magnitude of the gradient vector K is defined as the characteristic amount C0. The direction of the gradient vector K may form an angle between 0° and 359° with a predetermined direction (e.g. x direction in FIG. 4).

Figure 6A:
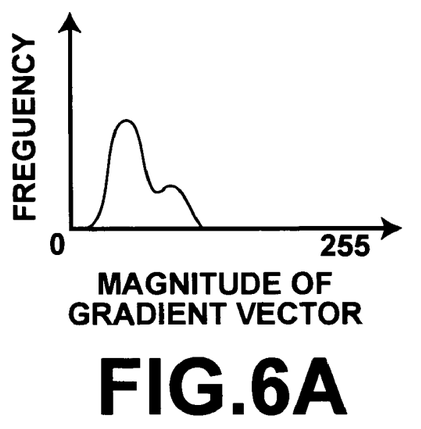
FIG. 6A is a drawing, illustrating a histogram of magnitudes of gradient vectors before normalization.
Figure 6B:
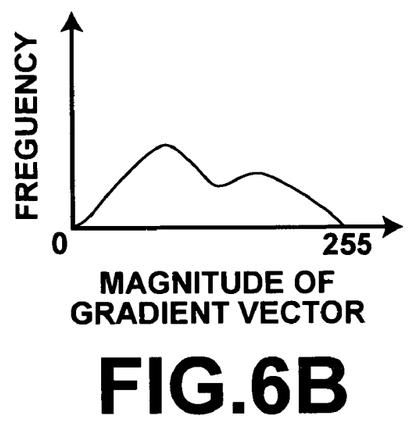
FIG. 6B is a drawing, illustrating a histogram of magnitudes of gradient vectors after normalization.
Figure 6C:
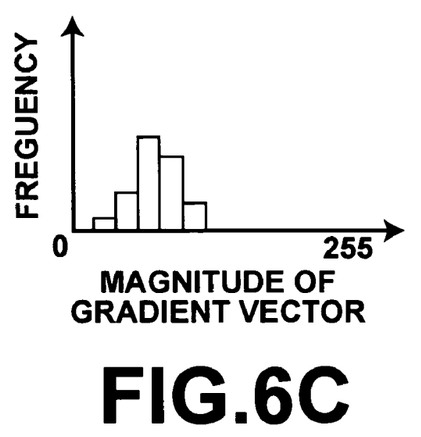
FIG. 6C is a drawing, illustrating a histogram of quinarized magnitudes of gradient vectors.
Figure 6D:
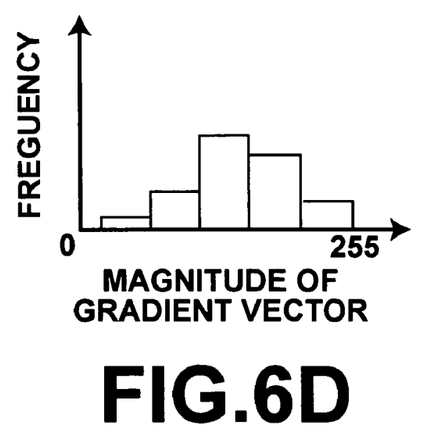
FIG. 6D is a drawing, illustrating a histogram of quinarized magnitudes of gradient vectors after normalization.

Here, the magnitudes of the gradient vectors K are normalized. The normalization is performed in the following manner. First, a histogram that represents the magnitudes of the gradient vectors K of all of the pixels within the photo image S0. Then, the magnitudes of the gradient vectors K are corrected by flattening the histogram so that the distribution of the magnitudes is evenly distributed across the range of values assumable by each pixel of the photo image S0 (0 through 255 in the case that the image data is 8 bit data). For example, in the case that the magnitudes of the gradient vectors K are small and concentrated at the low value side of the histogram as illustrated in FIG. 6A, the histogram is redistributed so that the magnitudes are distributed across the entire range from 0 through 255, as illustrated in FIG. 6B. Preferably, the distribution range of the gradient vectors K in a histogram is divided, for example, into five, in order to reduce the amount of calculations, as illustrated in FIG. 6C. Then, the gradient vectors K are normalized by redistributing the histogram such that the frequency distribution, which has been divided into five, is distributed across the entire range of values from 0 through 255, as illustrated in FIG. 6D.

The first reference data E1 stored in the first storage section 4 defines discrimination conditions for the combinations of the characteristic amount C0 for each pixel of each of a plurality of types of pixel groups, which are constituted by a plurality of pixels selected from sample images which will be described later.

The combinations of the characteristic amount of each of the pixels constituting each pixel group, and the discrimination conditions within the first reference data E1 are set in advance through the learning of the sample image group comprising a plurality of sample images known to be of faces, and a plurality of sample images known not to be of faces.

In the present embodiment, the plurality of sample images, which are known to be of faces (hereinafter referred to as "sample image group") for learning the first reference data E1 comprise a plurality of arbitrarily selected human facial photograph images (images having a human face). The sample image group might include faces having specific characteristics (e.g., eleglassed face, uniquely hairstyled face, and the like), but it is not biased to a specific characteristic.

Figure 7:
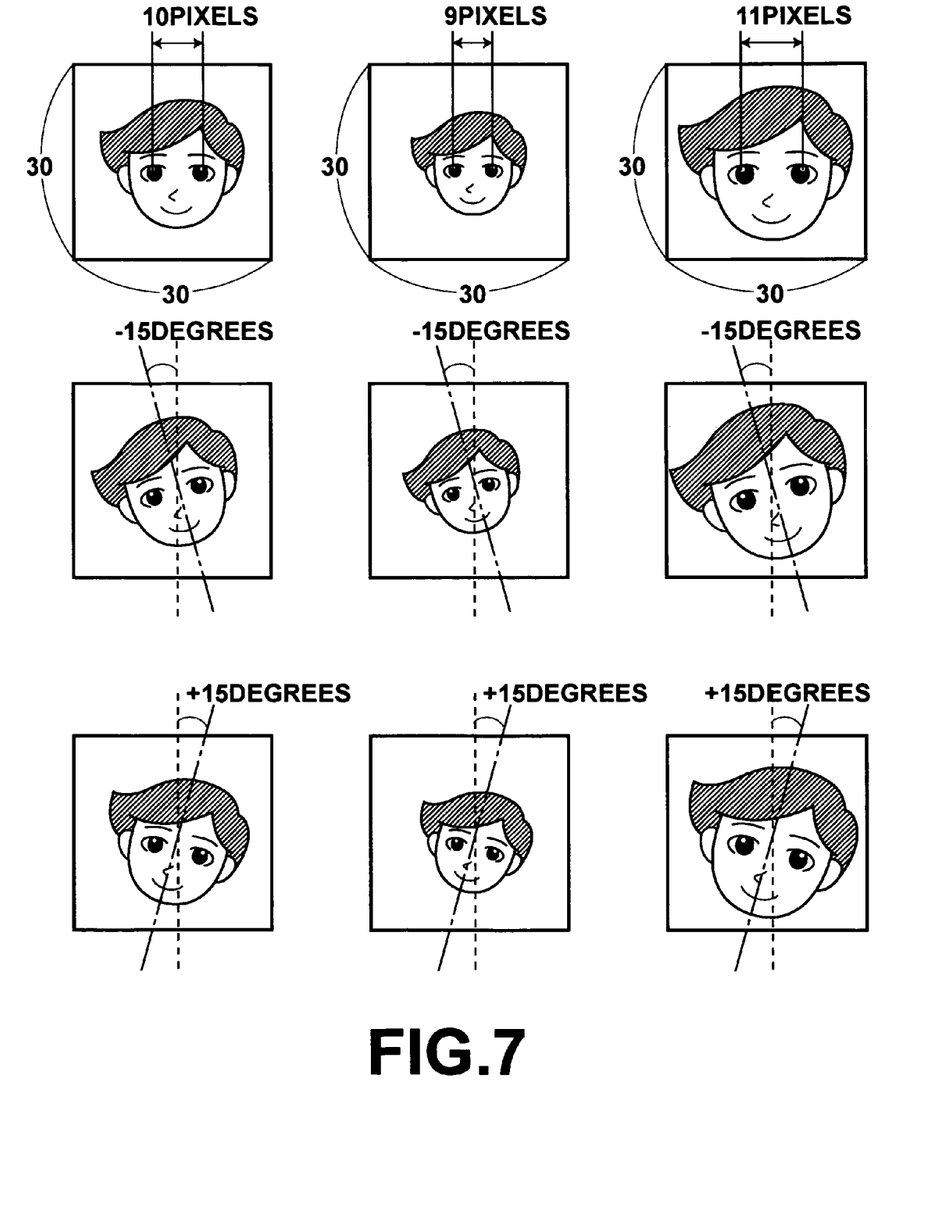
FIG. 7 is a drawing, illustrating examples of sample images which are known to be of faces stored in a first storage section 4 of the standard face detecting section 10 to be used for learning a first reference data E1.

In the present embodiment, when generating the first reference data E1, the following sample images are to be used as the sample images known to be of faces. The sample images are of a 30×30 pixel size, the distance between the centers of the eyes of each face image is one of 9, 10, or 11 pixels, and the faces are rotated stepwise in three degree increments within a range of ±15 degrees from the vertical (that is, the rotational angles are −15 degrees, −12 degrees, −9 degrees, −6 degrees, 0 degrees, 3 degrees, 6 degrees, 9 degrees, 12 degrees, and 15 degrees) as illustrated in FIG. 7. Accordingly, 33 sample images (3×11) are prepared for each face. Note that FIG. 7 illustrates only those sample images rotated −15 degrees, 0 degrees, and 15 degrees. The centers of the rotation are the intersections of the diagonals of the sample images. Here, in all of the sample images with the distance of 10 pixels between the centers of the eyes, the centers of the eyes are in the same positions, which are defined as (x1, y1) and (x2, y2) in the coordinates with the coordinate origin at the upper left corner of the sample images. The positions of the eyes in the vertical direction (i.e., y1, y2), in the state that the face is vertically oriented are the same for all of the sample images.

Arbitrary images of a 30×30 pixel size are to be used as the sample images known not to be of faces.

Consider the case in which sample images having the distance of 10 pixels between the eyes and the rotational angle of 0 degrees (that is, the faces are oriented vertically) are employed exclusively to perform learning. In this case, only those faces having the distance of 10 pixels between the eyes, and not rotated at all would be discriminated by referring to the first reference data E1. The sizes of the faces, which are possibly included in the photo images S0, are not uniform in size. Therefore, during the discrimination of a face, the photo image S0 is enlarged/reduced to enable discrimination of a face of a size that matches that of the sample images and positions of the eyes. However, in order to maintain the distance between the centers of the eyes accurately at ten pixels, it is necessary to enlarge/reduce the photo image S0 in a stepwise manner with magnification rates in 1.1 units, thereby causing the amount of calculations to be great.

Figure 8A:
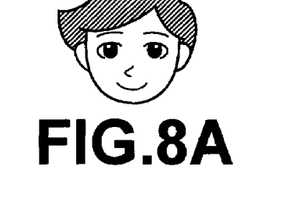
FIG. 8A is a drawing for describing rotation of a human face.
Figure 8B:
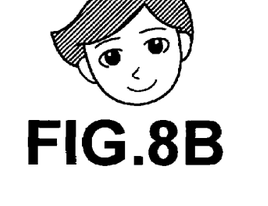
FIG. 8B is a drawing for describing rotation of a human face.
Figure 8C:
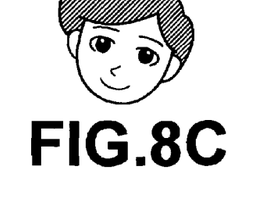
FIG. 8C is a drawing for describing rotation of a human face.

In addition, faces, which are possibly included in the photo images S0, are not only those which have rotational angles of 0 degrees, as that illustrated in FIG. 8A. There are cases in which the faces in the target images are rotated, as illustrated in FIG. 8B and FIG. 8C. However, in the case that sample images, in which the distance between the eyes are 10 pixels and the rotational angle is 0 degrees, are employed exclusively to perform learning, rotated faces such as those illustrated in FIG. 8B and FIG. 8C would not be discriminated as faces.

For these reasons, the present embodiment imparts an allowable range to the first reference data E1. This is accomplished by employing sample images, which are known to be of faces, in which the distances between the centers of the eyes are 9, 10, and 11 pixels, and which are rotated in a stepwise manner in three degree increments within a range of ±15 degrees. Thereby, the photo image S0 may be enlarged/reduced in a stepwise manner with magnification rates in 11/9 units when discrimination is conducted by a first discriminating section 5 which will be described later. This enables reduction of the time required for calculations, compared to a case in which the photo image S0 is enlarged/reduced with magnification rates in 1.1 units. In addition, rotated faces, such as those illustrated in FIG. 8B and FIG. 8C, are also enabled to be discriminated.

Figure 9:
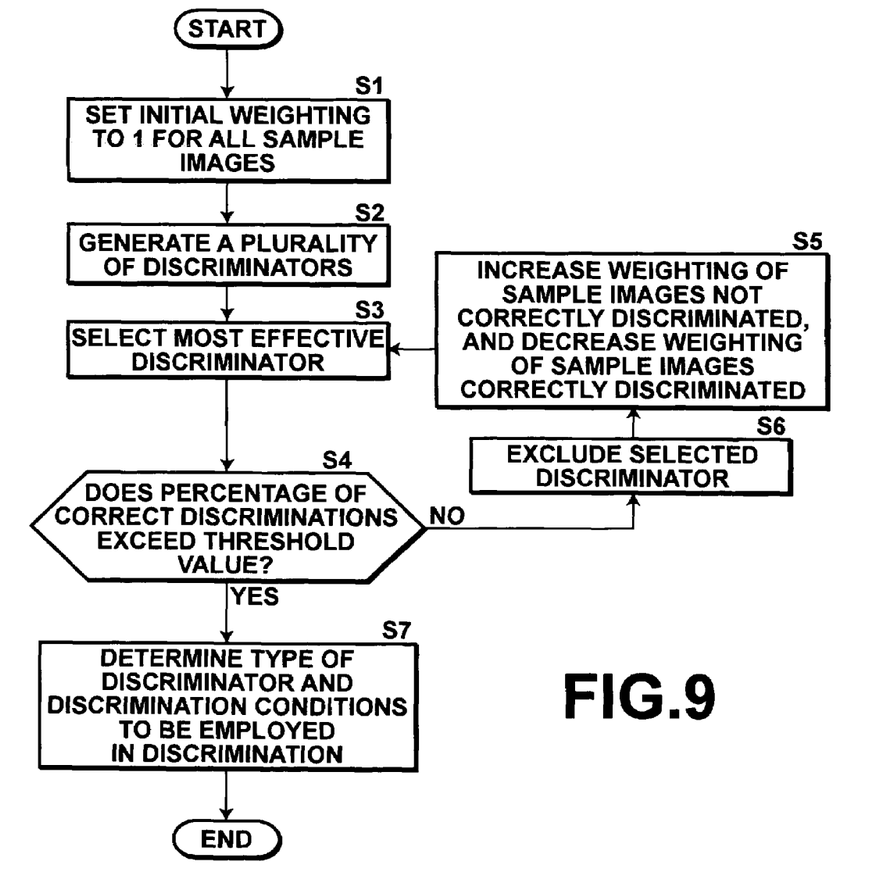
FIG. 9 is a flow chart, illustrating a learning process of reference data.

Hereinafter, an example of a learning technique employing the sample images will be described with reference to the flow chart of FIG. 9.

The sample images, which are the subject of learning, comprise a plurality of sample images known to be of faces, and a plurality of sample images known not to be of faces. Note that in the sample images known to be of faces, the distances between the centers of the eyes of each face within the images are one of 9, 10, or 11 pixels, and the faces are rotated stepwise in three degree increments within a range of ±15 degrees from the vertical. Each sample image is weighted, that is, is assigned a level of importance. First, the initial values of the weighting of all the sample images are set equally to 1 (step S1).

Next, discriminators are generated for each of the different types of pixel groups of the sample images (step S2). Here, each discriminator has a function of providing a reference to discriminate images of faces from those not of faces by employing combinations of the characteristic amount C0 for each pixel that constitutes a single pixel group. In the present embodiment, histograms of combinations of the characteristic amount C0 for each pixel that constitutes a single pixel group are used as the discriminators.

Figure 10:
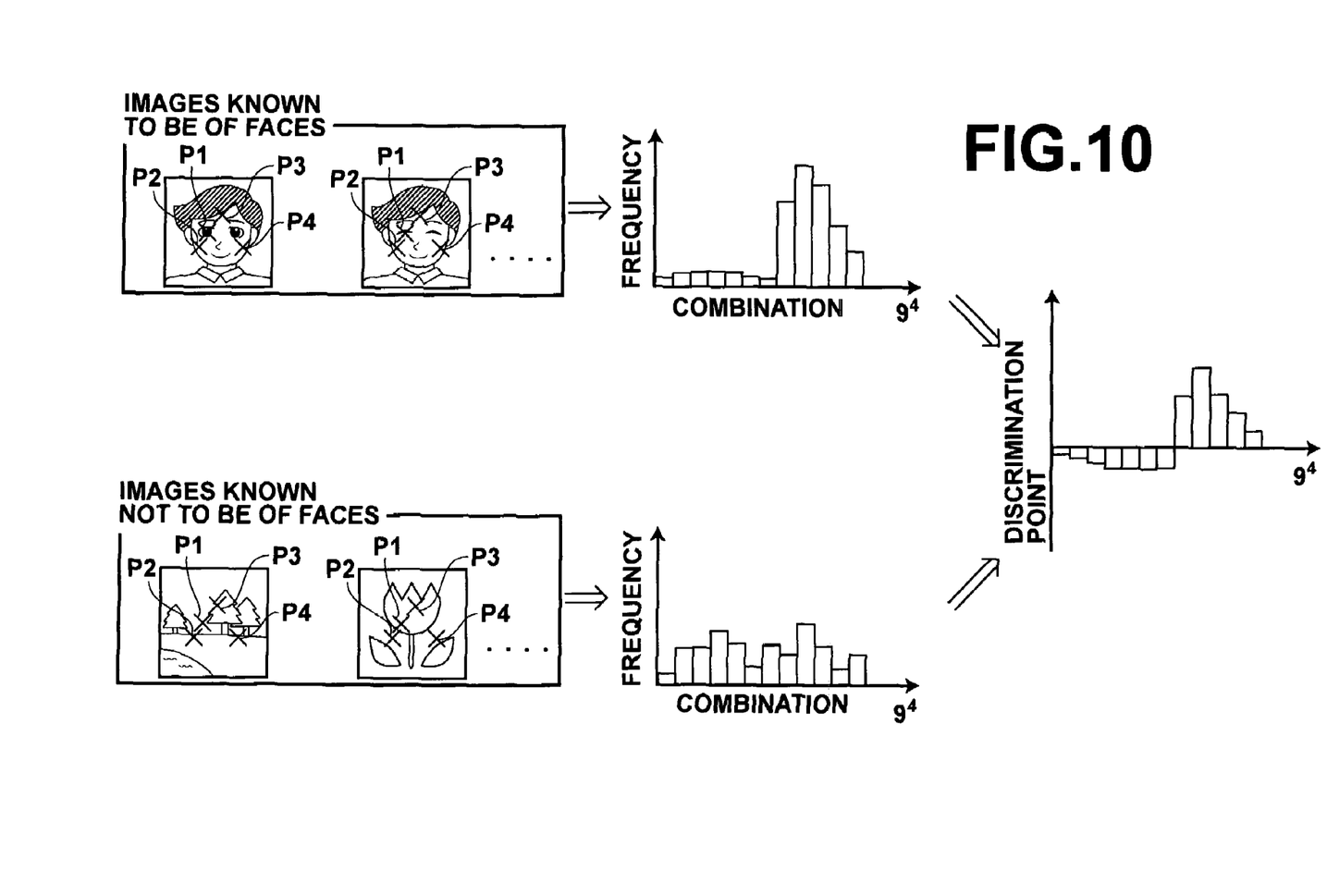
FIG. 10 is a drawing for describing an extraction method of a discriminator.

The generation of a discriminator will be described with reference to FIG. 10. As illustrated in the sample images at the left side of FIG. 10, the pixels that constitute the pixel group for generating the discriminator are: a pixel P1 at the center of the right eye; a pixel P2 within the right cheek; a pixel P3 within the forehead; and a pixel P4 within the left cheek of the sample images which are known to be of faces. Combinations of the characteristic amounts C0 of the pixels P1 through P4 are obtained for all of the sample images known to be of faces, and histograms thereof are generated. Here, the characteristic amounts C0 represent the directions and magnitudes of the gradient vectors K. However, there are 360 possible values (0 through 359) for the direction of the gradient vector K, and 256 possible values (0 through 255) for the magnitude thereof. If these values are employed as they are, the number of combinations would be four pixels at 360×256 per pixel, or $(360\times 256)^4$, which would require a multitude of samples, time, and memory for learning and detection. For this reason, in the present embodiment, the directions of the gradient vectors K are quaternarized, that is, set so that: values of 0 through 44 and 315 through 359 are converted to a value of 0 (right direction); values of 45 through 134 are converted to a value of 1 (upper direction); values of 135 through 224 are converted to a value of 2 (left direction); and values of 225 through 314 are converted to a value of 3 (lower direction). The magnitudes of the gradient vectors K are ternarized so that their values assume one of three values, 0 through 2. Then, the values of the combinations are calculated employing the following formulas.

Value of Combination=0 (in the case that the magnitude of the gradient vector is 0); and Value of Combination=(direction of the gradient vector+1)×magnitude of the gradient vector (in the case that the magnitude of the gradient vector>0).

Due to the above quaternarization and ternarization, the possible number of combinations becomes $9^4$, thereby reducing the amount of data of the characteristic amounts C0.

In a similar manner, histograms are generated for the plurality of sample images known not to be of faces. Note that in the sample images known not to be of faces, pixels (denoted by the same reference numerals P1 through P4) at positions corresponding to the pixels P1 through P4 of the sample images known to be of faces, are employed in the calculation of the characteristic amounts C0. Logarithms of the ratios of the frequencies in the two histograms are represented by the rightmost histogram illustrated in FIG. 10, which is employed as the discriminator. According to the discriminator, images that have distributions of the characteristic amounts C0 corresponding to positive discrimination points therein are highly likely to be of faces. The likelihood that an image is of a face increases with an increase in the absolute values of the discrimination points. On the other hand, images that have distributions of the characteristic amounts C0 corresponding to negative discrimination points of the discriminator are highly likely not to be of faces. Again, the likelihood that an image is not of a face increases with an increase in the absolute values of the negative discrimination points. A plurality of discriminators in histogram format regarding combinations of the characteristic amount C0 for each pixel of the plurality of types of pixel groups is generated in step S2, which may be used during discrimination.

Thereafter, a discriminator, which is the most effective in discriminating whether an image is of a face, is selected from the plurality of discriminators generated in step S2. The selection of the most effective discriminator is performed while taking the weighting of each sample image into consideration. In this example, the percentages of correct discriminations provided by each of the discriminators are compared, and the discriminator having the highest weighted percentage of correct discriminations is selected (step S3). At the step S3 of the first round, all of the weighting of the sample images are equal, at 1. Therefore, the discriminator that correctly discriminates whether sample images are of faces with the highest frequency is selected as the most effective discriminator. On the other hand, the weightings of each of the sample images are renewed at step S5, to be described later. Thereafter, the process returns to step S3. Therefore, at the step S3 of the second round, there are sample images weighted with 1, those weighted with a value less than 1, and those weighted with a value greater than 1. Accordingly, during evaluation of the percentage of correct discriminations, a sample image, which has a weighting greater than 1, is counted more than a sample image, which has a weighting of 1. For these reasons, from the step S3 of the second and subsequent rounds, more importance is placed on correctly discriminating heavily weighted sample images than lightly weighted sample images.

Next, confirmation is made regarding whether the percentage of correct discriminations of a combination of the discriminators which have been selected exceeds a predetermined threshold value (step S4). That is, the percentage of discrimination results regarding whether sample images are of faces, which are obtained by the combination of the selected discriminators, that match the actual sample images is compared against the predetermined threshold value. Here, the sample images, which are employed in the evaluation of the percentage of correct discriminations, may be those that are weighted with different values, or those that are equally weighted. In case that the percentage of correct discriminations exceeds the predetermined threshold value, whether an image is of a face can be discriminated by the selected discriminators with sufficiently high accuracy, therefore the learning process is terminated. In the case that the percentage of correct discriminations is less than or equal to the predetermined threshold value, the process proceeds to step S6, to select an additional discriminator, to be employed in combination with the discriminators which have been selected thus far.

The discriminator, which has been selected at the immediately preceding step S3, is excluded from selection in step S6, so that it is not selected again.

Next, the weighting of sample images, which were not correctly discriminated by the discriminator selected at the immediately preceding step S3, is increased, and the weighting of sample images, which were correctly discriminated, is decreased (step S5). The reason for increasing and decreasing the weighting in this manner is to place more importance on images which were not correctly discriminated by the discriminators that have been selected thus far. In this manner, selection of a discriminator which is capable of correctly discriminating whether these sample images are of a face is encouraged, thereby improving the effect of the combination of discriminators.

Thereafter, the process returns to step S3, and another effective discriminator is selected, using the weighted percentages of correct discriminations as a reference.

The above steps S3 through S6 are repeated to select discriminators corresponding to combinations of the characteristic amount C0 for each pixel that constitutes specific pixel groups, which are suited for discriminating whether faces are included in images. If the percentages of correct discriminations, which are evaluated at step S4, exceed the threshold value, the type of discriminator and discrimination conditions, which are to be employed in discrimination regarding whether images include faces, are determined (step S7), and the learning of the first reference data E1 is terminated.

Note that in the case that the learning technique described above is applied, the discriminators are not limited to those in the histogram format. The discriminators may be of any format, as long as they provide references to discriminate between images of faces and other images by employing combinations of the characteristic amount C0 for each pixel that constitutes specific pixel groups. Examples of alternative discriminators are: binary data, threshold values, functions, and the like. As a further alternative, a histogram that represents the distribution of difference values between the two histograms illustrated in the center of FIG. 10 may be employed, in the case that the discriminators are of the histogram format.

The learning technique is not limited to that which has been described above. Other machine learning techniques, such as a neural network technique, may be employed.

The first discriminating section 5 refers to the discrimination conditions of the first reference data E1, which has been learned regarding every combination of the characteristic amount C0 of each pixel that constitutes a plurality of types of pixel groups. Thereby, the discrimination points of the combinations of the characteristic amount C0 of each pixel that constitutes each of the pixel groups are obtained. Whether a face is included in the photo image S0 is discriminated by totaling the discrimination points. At this time, the directions and magnitudes of the gradient vectors K, which are the characteristic amounts C0, are quaternarized and ternarized respectively. In the present embodiment, discrimination is performed based on the total sum of all of the discrimination points. For example, in the case that the total sum of the discrimination points is positive, and is greater than or equal to a predetermined threshold value, it is judged that a face is included in the photo image S0. In the case that the total sum of the discrimination points is less than the predetermined threshold value, it is judged that a face is not included in the photo image S0.

Figure 11:
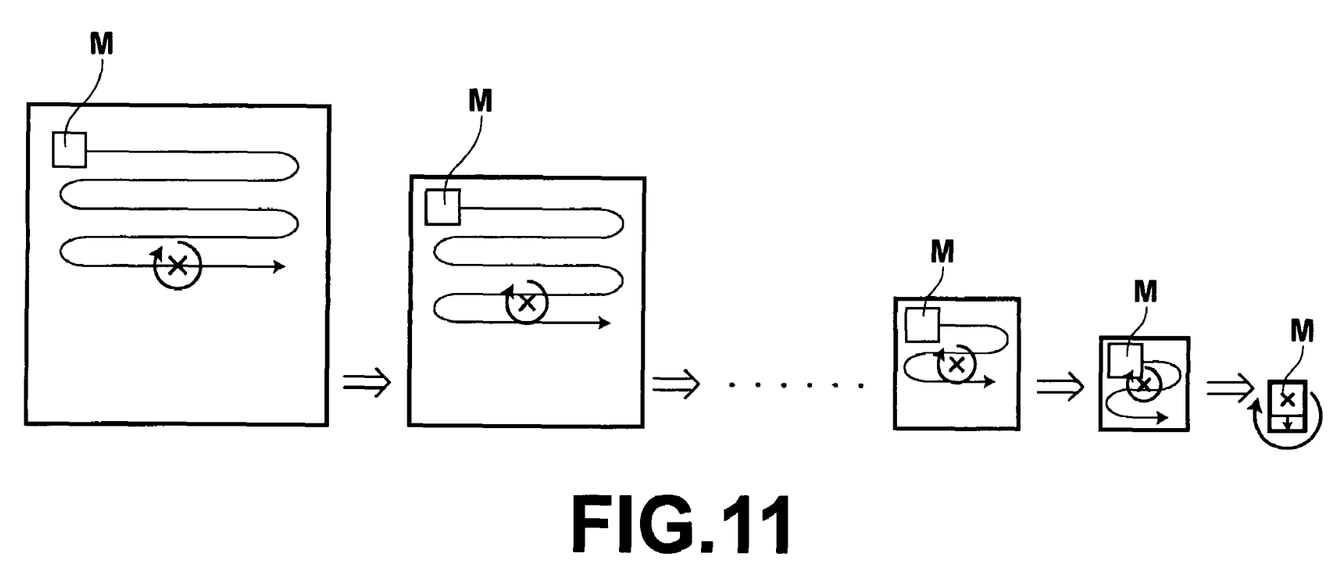
FIG. 11 is a drawing for describing gradual transformation of a photo image when a face is detected by a first discriminating section of the standard face detecting section 10 shown in FIG. 2.

Here, the sizes of the photo images S0 are varied, unlike the sample images, which are 30×30 pixels. In addition, in the case that a face is included in the photo image S0, the face is not necessarily in the vertical orientation. For these reasons, the first discrimination section 5 enlarges/reduces the photo image S0 in a stepwise manner (FIG. 11 illustrates a reduction process), so that the size thereof becomes 30 pixels either in the vertical or horizontal direction. In addition, the photo image S0 is rotated in a stepwise manner over 360 degrees. A mask M, which is 30×30 pixels large, is set on the photo image S0, at every stepwise increment of the enlargement/reduction. The mask M is moved one pixel at a time on the photo image S0, and whether a face is included in the photo image S0 is discriminated by discriminating whether the image within the mask is that of a face.

Note that as the sample images learned during the generation of the first reference data E1, sample images in which the distances between the centers of the eyes are one of 9, 10, and 11 pixels are used. Therefore, the magnification rate during enlargement/reduction of the photo image S0 may be set to be 11/9. In addition, as the sample images learned during the generation of the first reference data E1, sample images in which faces are rotated within the range of ±15 degrees are used. Therefore, the photo image S0 may be rotated over 360 degrees in 30 degree increments.

Here, the characteristic amount calculating section 1 calculates the characteristic amounts C0 from the photo image S0 at each step of the stepwise enlargement/reduction and rotational deformation. Note that the characteristic amounts C0 calculated by the characteristic amount calculating section 1 are related to the steps where they have been obtained and stored in a temporary storage means (not shown).

Discrimination regarding whether a face is included in the photo image S0 is performed at every step in the stepwise enlargement/reduction and rotational deformation thereof. In the case that a face is discriminated once, the photo image S0 is discriminated to include the face. A region of 30×30 pixels large, corresponding to the position of the mask M at the time of discrimination, is extracted from the photo image S0 at the step in the stepwise size and rotational deformation at which the face was discriminated.

Figure 12:
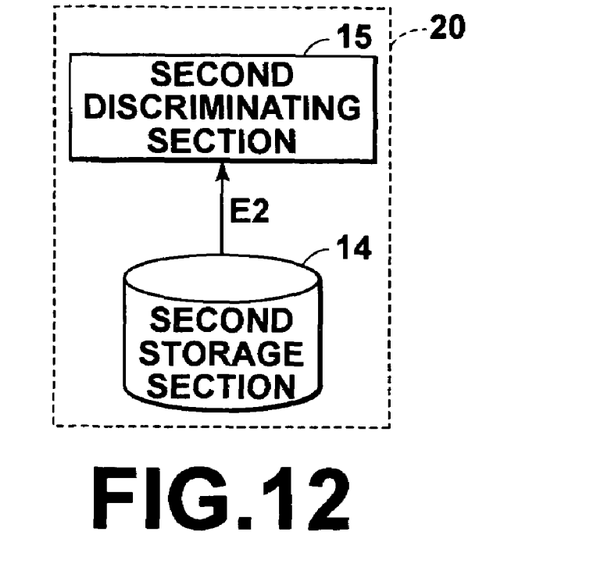
FIG. 12 is a block diagram of an eyeglassed face detecting section 20 of the face detecting apparatus shown in FIG. 1, illustrating the structure thereof.

FIG. 12 is a block diagram of the eyeglassed face detecting section 20 of the face detecting apparatus according to the embodiment shown in FIG. 1, illustrating the structure thereof. As shown in the drawing, the eyeglassed face detecting section 20 has a second storage section 14 and a second discriminating section 15. The second storage section 14 has a second reference data E2 stored therein. The second discriminating section 15 detects a face from the photo image S0 using the second reference data E2 and characteristic amounts C0 calculated by the characteristic amount calculating means 1 and stored in a temporary storage means (not shown).

The second reference data E1 stored in the second storage section 14 defines discrimination conditions for the combinations of the characteristic amount C0 for each pixel of each of a plurality of types of pixel groups, which are constituted by a plurality of pixels selected from sample images which will be described later.

The combinations of the characteristic amount of each of the pixels constituting each pixel group, and the discrimination conditions within the second reference data E2 are set in advance through the learning of the sample image group comprising a plurality of sample images known to be of faces, and a plurality of sample images known not to be of faces.

In the present embodiment, the plurality of sample images known to be of faces for learning the second reference data E2 comprise eyeglassed human facial photograph images only, unlike those for learning the first reference data E1 used in the standard face detecting section 10.

The operation of the eyeglassed face detecting section 20 is similar to that of the standard face detecting section 10, except that the second reference data E2 differs from the first reference data E1. Therefore, it will not be elaborated upon further here.

Figure 13:
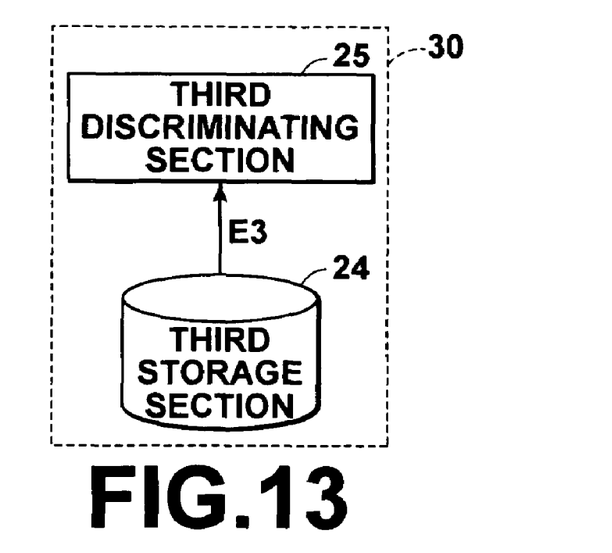
FIG. 13 is a block diagram of a whiskered face detecting section 30 of the face detecting apparatus shown in FIG. 1, illustrating the structure thereof.

FIG. 13 is a block diagram of the whiskered face detecting section 30 of the face detecting apparatus according to the embodiment shown in FIG. 1, illustrating the structure thereof. As shown in the drawing, the whiskered face detecting section 30 has a third storage section 24 and a third discriminating section 25. The third storage section 24 has a third reference data E3 stored therein. The third discriminating section 25 detects a face from the photo image S0 using the third reference data E3 and characteristic amounts C0 calculated by the characteristic amount calculating means 1 and stored in a temporary storage means not shown in the drawing.

The third reference data E3 stored in the third storage section 24 defines discrimination conditions for the combinations of the characteristic amount C0 for each pixel of each of a plurality of types of pixel groups, which are constituted by a plurality of pixels selected from sample images which will be described later.

The combinations of the characteristic amount of each of the pixels constituting each pixel group, and the discrimination conditions within the third reference data E3 are set in advance through the learning of the sample image group comprising a plurality of sample images known to be of faces, and a plurality of sample images known not to be of faces.

In the present embodiment, the plurality of sample images known to be of faces for learning the third reference data E3 comprise whiskered human facial photograph images only, unlike those for learning the first reference data E1 used in the standard face detecting section 10, or those for learning the second reference data E2 used in the eyeglassed face detecting section 20.

The operation of the whiskered face detecting section 30 is similar to that of the standard face detecting section 10, except that the third reference data E3 differs from the first reference data E1. Therefore, it will not be elaborated upon further here.

Figure 14:
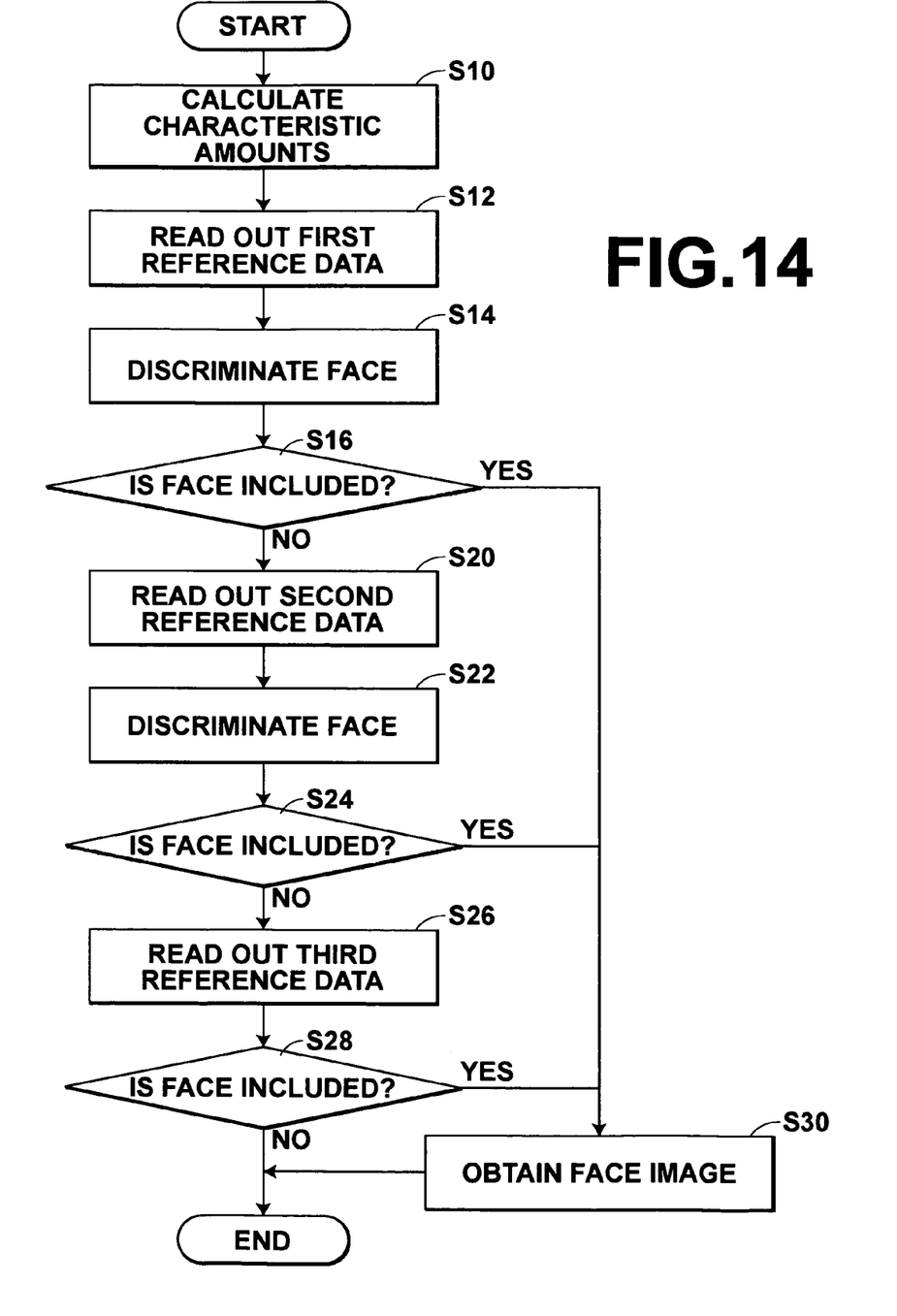
FIG. 14 is a flowchart, illustrating a process flow of the face detecting apparatus shown in FIG. 1.

FIG. 14 is a flowchart, illustrating a process flow of the face detecting apparatus shown in FIG. 1. As shown in the flowchart, the characteristic amount calculating section 1 first calculates the directions and magnitudes of the gradient vectors K from the photo image S0 as the characteristic amounts C0 at each step of the stepwise enlargement/reduction and rotational deformation, and stores them in a temporary storage means (not shown) (step S10). The first discriminating section 5 of the standard face detecting section 10 reads out the first reference data E1, which have been obtained by learning the sample images comprising a multitude of arbitrary human facial photograph images and sample images known not to be of faces, from the first storage section 4 (step S12). Then it performs discrimination whether a face is included in the photo image S0 based on the first reference data E1 and the characteristic amounts C0 obtained by the characteristic amount calculating section 1 (step S14).

If the first discriminating section 5 of the standard face detecting section 10 discriminates that a face is included in the photo image S0 (step S16 is positive), it extracts the face from the photo image S0 (step S30), and the process of the face detecting apparatus of the present embodiment for the photo image S0 is terminated.

On the other hand, if a face has not been discriminated by the standard face detecting section 10 (step S16 is negative), the control section 50 instructs the eyeglassed face detecting section 20 to initiate the detection of a face from the photo image S0. The second discriminating section 15 of the eyeglassed face detecting section 20 reads out the second reference data E2, which have been obtained by learning sample images comprising only of eyeglassed human facial photograph images and sample images known not to be of faces, from the second storage section 14 (step S20). Then it performs discrimination whether a face is included in the photo image S0 based on the second reference data E2 and the characteristic amounts C0 obtained by the characteristic amount calculating section 1 (step S22).

If the second discriminating section 15 of the eyeglassed face detecting section 20 discriminates that a face is included in the photo image S0 (step S24 is positive), it extracts the face from the photo image S0 (step S30), and the process of the face detecting apparatus of the present embodiment for the photo image S0 is terminated.

If a face has not been discriminated by the eyeglassed face detecting section 20 (step S24 is negative), the control section 50 further instructs the whiskered face detecting section 30 to initiate the detection of a face from the photo image S0. The third discriminating section 25 of the whiskered face detecting section 30 reads out the third reference data E3, which have been obtained by learning sample images comprising only of whiskered human facial photograph images and sample images known not to be of faces, from the third storage section 24 (step S26). Then it performs discrimination whether a face is included in the photo image S0 based on the third reference data E3 and the characteristic amounts C0 obtained by the characteristic amount calculating section 1 (step S28).

If the third discriminating section 25 of the whiskered face detecting section 30 discriminates that a face is included in the photo image S0 (step S28 is positive), it extracts the face from the photo image S0 (step S30), and the process of the face detecting apparatus of the present embodiment for the photo image S0 is terminated. If the third discriminating section 25 of the whiskered face detecting section 30 discriminates that a face is not included in the photo image S0 (step S28 is negative), the control section 50 terminates the process for the photo image S0.

As has been described, the standard face detecting section 10, eyeglassed face detecting section 20, and whiskered face detecting section 30 of the face detecting apparatus according to the present embodiment are provided for detecting standard faces, eyeglassed faces, and whiskered faces respectively. Thus, high detection accuracy may be obtained for the respective target objects. Further, separation of the detection process for respective types of faces into a plurality of processes allows reduced amount of calculations and rapid processing.

The preferred embodiment of the present invention has been described. But, the present invention is not limited to the embodiment described above, and various additions/reductions and modifications may be made without departing from the spirit of the present invention.

For example, in the present embodiment, the eyeglassed face detection process and whiskered face detection process are provided as the detection processes for detecting characteristic faces. But, the detection processes of the present invention are not limited to these, and the number of detection processes and types for detecting characteristic faces may be increased or decreased.

Further, in the present embodiment, the predetermined target object to be detected from a digital image is a face. But, the target object detecting method, apparatus, and program may be applied for detecting any target object.

Still further, the methods used in the standard target object detecting process (standard face detecting process in the present embodiment) and characteristic target object detecting processes (eyeglassed face detecting process and whiskered face detecting process in the present embodiment) are not limited to those used in the present invention. But, various known target object detecting methods may be employed.

What is claimed is:

1. A target object detecting method for detecting from a digital image a predetermined target object included therein, said method comprising the steps of:
   using a computer to carry out the steps of:
   performing a standard target object detecting process for detecting the predetermined target object having a standard characteristic on the digital image; and
   performing a characteristic target object detecting process for detecting the predetermined target object having a predetermined specific characteristic on the digital image from which said predetermined target object has not been detected by said standard target object detecting process,
   wherein a plurality of characteristic target object detecting processes, each corresponding to each of the predetermined specific characteristics that differ from each other, are performed sequentially until said predetermined target object has been detected, and
   the predetermined specific characteristics include an eyeglassed face, a whiskered face or a uniquely hairstyled face.

2. The target object detecting method according to claim 1, wherein said digital image is a facial photograph image, and said predetermined target object is a face.

3. The target object detecting method according to claim 1, wherein the predetermined specific characteristics include an eyeglassed face, a whiskered face and a uniquely hairstyled face.

4. The target object detecting method according to claim 3, wherein the eyeglassed face, the whiskered face and the uniquely hairstyled face are detected by referencing reference data comprising eyeglassed human facial photograph images, whiskered human facial photograph images and uniquely hairstyled human facial photograph images, respectively.

5. The target object detecting method according to claim 4, wherein the plurality of characteristic target object detecting processes are terminated when a percentage of correct discriminations exceeds a predetermined threshold value.

6. The target object detecting method according to claim 1, wherein the plurality of characteristic target object detecting processes are terminated when a percentage of correct discriminations exceeds a predetermined threshold value.

7. A target object detecting apparatus for detecting from a digital image a predetermined target object included therein, said apparatus comprising:

a standard target object detecting means for detecting the predetermined target object having a standard characteristic from the digital image;

a characteristic target object detecting means for detecting the predetermined target object having a predetermined specific characteristic; and a control means for controlling said characteristic target object detecting means so that said detection process by said characteristic target object detecting means is performed on the digital image from which said predetermined target object has not been detected by said standard target object detecting means, wherein said apparatus has a plurality of characteristic target object detecting means, each corresponding to each of the predetermined specific characteristics that differ from each other, and said control means is a control means for controlling said plurality of characteristic target object detecting means so that said detection processes by said plurality of characteristic target object detecting means are performed sequentially until said predetermined target object has been detected, wherein the predetermined specific characteristics include an eyeglassed face, a whiskered face or a uniquely hairstyled face.

8. The target object detecting apparatus according to claim 7, wherein said digital image is a facial photograph image, and said predetermined target object is a face.

9. A computer-readable medium having recorded thereon a program for causing a computer to execute a target object detecting process for detecting from a digital image a predetermined target object included therein, wherein said target object detecting process comprises:

a standard target object detecting process for detecting the predetermined target object having a standard characteristic, and a characteristic target object detecting process for detecting the predetermined target object having a predetermined specific characteristic from the digital image from which said predetermined target object has not been detected by said standard target object detecting process, wherein a plurality of characteristic target object detecting processes, each corresponding to each of the predetermined specific characteristics that differ from each other, are performed sequentially until said predetermined target object has been detected, and the predetermined specific characteristics include an eyeglassed face, a whiskered face or a uniquely hairstyled face.

10. The computer-readable medium according to claim 9, wherein said digital image is a facial photograph image, and said predetermined target object is a face.

* * * * *